United States Patent [19]
Ho et al.

[11] Patent Number: 5,900,985
[45] Date of Patent: May 4, 1999

[54] POLARIZATION CONVERTER FOR UNPOLARIZED LIGHT

[75] Inventors: Fang-Chuan Ho, Hsinchu; June-Jei Huang, Taoyuan Hsien; Chi-Hua Lee, Taipei Hsien; Chun Chuan Lin, Chang Hua, all of Taiwan

[73] Assignee: Industrial Technology Research Institute, Taiwan

[21] Appl. No.: 09/055,581

[22] Filed: Apr. 6, 1998

[30] Foreign Application Priority Data

Oct. 20, 1997 [TW] Taiwan .................................. 86115426

[51] Int. Cl.⁶ ............................. G02B 27/12; F21V 29/00
[52] U.S. Cl. ............................................ 359/640; 362/268
[58] Field of Search ................................... 359/639, 640; 362/268

[56] References Cited

U.S. PATENT DOCUMENTS 4,974,919 12/1990 Muraki et al. ........................... 359/204
5,307,207 4/1994 Ichihara ................................. 359/619
5,459,547 10/1995 Shiozawa .................................. 355/67

*Primary Examiner*—Georgia Epps
*Assistant Examiner*—Suzanne Letendre
*Attorney, Agent, or Firm*—Blakely Sokoloff Taylor & Zafman

[57] ABSTRACT

A polarization converter for unpolarized light. The polarization converter comprises a prism, a wedge, a set of lens arrays, a first reflecting plane, and a second reflecting plane. The wedge comprises a tilt plane. The tilt plane is coated with multi-layer polarization dichronic thin film. The set of lens arrays comprises a light distributor and a light integrator. The tilt plane of the wedge is glued on the first reflecting plane. A second reflecting plane is the unglued plane of the wedge. When a light beam is incident towards the incident plane, the first reflecting plane splits and polarizes the light beam into a first type polarized and a second type polarized lights. Through the multi-layer polarization dichronic thin film, about 99% of the first type polarized light is reflected, and about 99% of the second type polarized light is transmitted and incident on the second reflecting plane. By adjusting the critical angle between the second reflecting plane and the air, almost all the second type polarized light is reflected. The second type polarized light is then traveling through a half-wave plate and converted to a first type polarized light. A good uniformity and a high efficiency are obtained on the projection screen by the disposition of a light distributor lens array in front of the incident plane and a light integrator lens array on the emerging plane of the prism.

6 Claims, 3 Drawing Sheets

POLARIZATION CONVERTER FOR UNPOLARIZED LIGHT

CROSS-REFERENCE TO RELATED APPLICATION

This application claims priority benefit of Taiwan application Serial no. 86115426, filed Oct. 20, 1997, the full disclosure of which is incorporated herein by reference.

BACKGROUND OF THE INVENTION

1. Field of the Invention

The invention relates to a polarization converter for an unpolarized light, and more particularly to a polarizing beam splitter (BSP) used in a liquid crystal display system.

2. Description of the Related Art

In a conventional polarizing plate in a liquid crystal projection system, energy loss is caused during light absorption. To develop a high efficient polarizing device is therefore a topic studied intensively in industry.

In FIG. 1, an improved conventional polarizing system is shown. A light source 10 is reflected and collimated as a light beam 14 by a parabolic mirror 12. The light beam 14 is incident on a PSB 16 with an angle of 45°. After the PSB 16, the parallel light beam 14 is split into a parallel (P-) polarized light 14a and a senkrecht (S-) polarized light 14b. The P-polarized travels forward in the same direction as the incident light beam 14. The S-polarized light 14b travels with a right angle of the light beam 14. The S-polarized light 14b is further incident and reflected by a reflecting mirror 18 with an angle of 45°. The S-polarized light 14b travels further and is incident on a half wave plate 20. After the half wave plate 20, the S-polarized light is then converted into a P-polarized light 14c which travels parallel to the P-polarized light 14a. In the above system, the light is polarized and split. However, as shown in the figure, the cross section of the light beam is multiplied, and it is more difficult for light distributing and converging.

A technique which modifies the above PBS into an array is disclosed in "SID 97 DIGEST, pp.993–996, 1997" by Itol et al. The structure of the optical layout can be referred to FIG. 2a and FIG. 2b. In FIG. 2a and FIG. 2b, a light source 20 is reflected as a collimated light beam 24 by a parabolic reflector 22. While traveling through a first lens array 26, that is, a light distributor lens array, and a second lens array 28, that is, a light integrator lens array, the collimated light beam 24 is converged on a prism in the PBS 30. After the prism, the collimated light beam 24 is split into a P-polarized light P1 traveling straight forward and a S-polarized light S1 deflected with a right of about 90°. The S-polarized light S1 is reflected by a reflecting mirror, and then travels parallel to the P-polarized light P1. Through a half-wave plate, the P-polarized P1 is converted as an S-polarized light S2. The S-polarized lights S1 and S2 are converged by a light condenser lens 32. The converged light is then projected on a liquid crystal light valve (LCLV) 34. By the lens arrays and the PBS 30 in a form of an array, a light source is split and polarized. The dimension of reflecting and polarizing mirrors are compact. The cross section of the resultant light is consequently reduced to achieve light distributing and polarizing. However, the fabrication is difficult, the fabrication cost is high, and the efficiency is degraded by the array combination.

An equivalent Wollaston prism with a small size and low cost is disclosed in US Pat. No. 5,448,407. Two prisms are assembled to polarize and split an incident light. In FIG. 3, an equivalent Wollaston prism comprises a first prism 62 and a second prism 64. The first prism 62 has an incident plane 622, a polarizing splitting plate 624, and an emerging plane 626. The second prism 64 has a boundary plane 644 and a reflecting plane 626. A beam of incident light L1 enters the equivalent Wollaston prism 62 through the incident plane 622, having its optical axis directed towards the polarizing splitting plate 624. The incident light L1 is split into one perpendicular P-polarized light LP emerging through the emerging mirror 626, and an S-polarized light LS traveling further and reflected by the boundary plane 644 with a right angle. The S-polarized light LS is then emerging through the emerging mirror 626 in a same direction of the P-polarized light LP. The incident light is thus split and polarized. In the equivalent Wollaston prism, the first prism 62 has functions of splitting, polarizing, and reflecting light, while the second prism 64 has the only function of reflecting light. The resultant emerging light comprises two light beams with different polarization. To obtain a resultant light comprises two light beams, other equipment or apparatus is required.

SUMMARY OF THE INVENTION

It is therefore an object of the invention to provide a polarization converter. The tilt plane of a wedge is glued on the reflecting plane of a prism. A single- or multi-layer polarization dichronic thin film is coated on the tilt plane of the wedge. A light incident on the first reflecting plane is split and polarized. One of the split and polarized light incident on the second reflecting plane is converted to the other type of polarization. The system is compact, and a high efficiency is obtained. The resultant light projection is uniform.

To achieve these objects and advantages, and in accordance with the purpose of the invention, as embodied and broadly described herein, the invention is directed towards a polarization converter for unpolarized light. The polarization converter comprises a prism, a wedge, a set of lens arrays, a first reflecting plane, and a second reflecting plane. The wedge comprises a tilt plane. The tilt plane is coated with multi-layer polarization dichronic thin film. The set of lens arrays comprises a light distributor and a light integrator. The tilt plane of the wedge is glued on the first reflecting plane. A second reflecting plane is the unglued plane of the wedge. When a light beam is incident towards the incident plane, the first reflecting plane splits and polarizes the light beam into a first type polarized and a second type polarized lights. Through the multi-layer polarization dichronic thin film, about 99% of the first type polarized light is reflected, and about 99% of the second type polarized light is transmitted and incident on the second reflecting plane. By adjusting the critical angle between the second reflecting plane and the air, almost all the second type polarized light is reflected. The second type polarized light is then traveling through a half-wave plate and converted to a first type polarized light. A good uniformity and a high efficiency are obtained on the projection screen by the disposition of a light distributor lens array in front of the incident plane and a light integrator lens array on the emerging plane of the prism.

It is to be understood that both the foregoing general description and the following detailed description are exemplary and explanatory only and are not restrictive of the invention, as claimed.

DESCRIPTION OF THE PREFERRED EMBODIMENTS

In the invention, the superposition characteristic of light is applied. On a reflecting plane of a prism, a wedge is glued. Two reflecting planes with different angle and position are thus formed. Through the first plane, an incident light is split and polarized into two light beams with different polarization. The first reflecting plane reflects 99% of the first polarized light beam, while 99% of the second polarized light beam transmits through the first reflecting plane. By adjusting a critical angle between the second reflecting plane and air, about 100% of the incident second polarized light beam is reflected by the second reflecting plane. More than 99% of the reflected second polarized light beam transmits through prism, and travels through a half-wave plane to be converted to a first type polarization. In addition, a light distributor lens array is disposed in front of the incident plane, and a light integrator lens array is disposed on the emerging plane of the prism in order to obtain a uniform and high efficient image. A detailed description of the invention is as follows.

Figure 1:
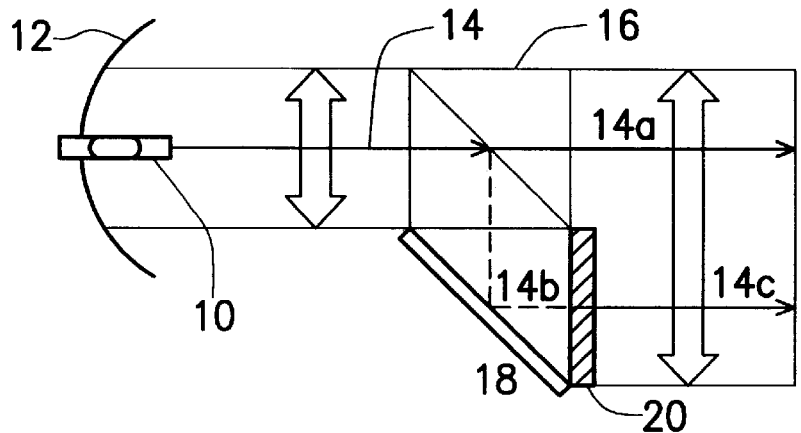
FIG. 1 shows an improved conventional light polarization system.
Figure 2A:
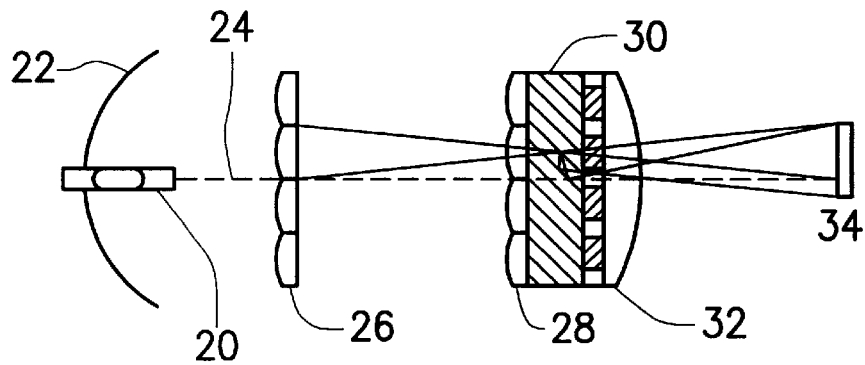
FIG. 2a and FIG. 2b show a PBS in an array style based on the theory of the light polarization system shown in FIG. 1.
Figure 2B:
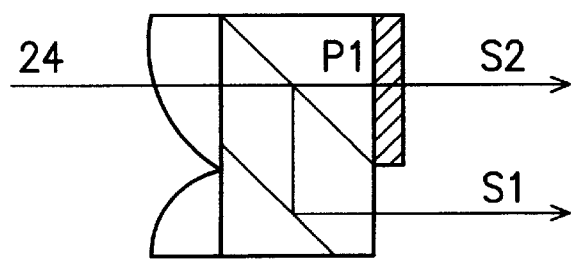
Figure 3:
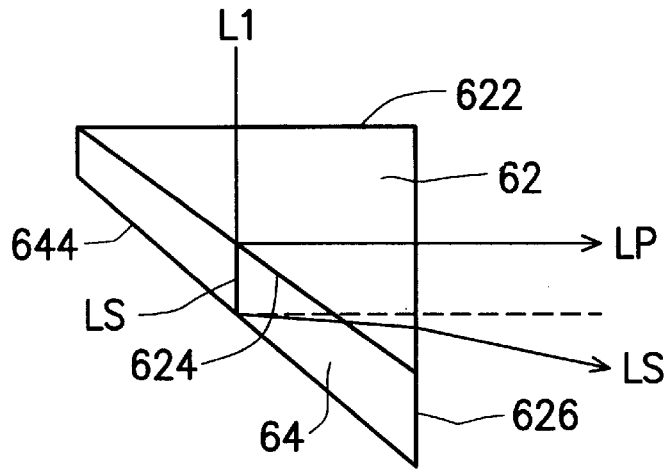
FIG. 3 shows an equivalent Wollaston prism.
Figure 4A:
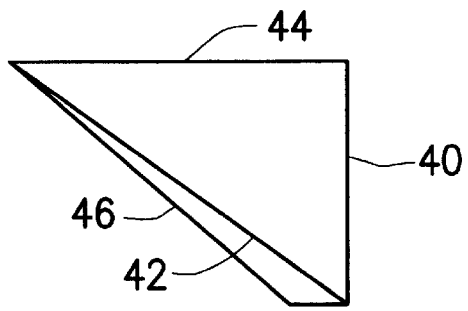
FIG. 4a to FIG. 4c are top views of a polarization converter in a preferred embodiment according to the invention.

Referring to FIG. 4a, a prism comprising an incident plane 40, a reflecting plane 42, and an emerging plane 44 is provided. A wedge having a tilt plane coated with a single- or multi-layer polarization dichronic thin film is glued on the reflecting plane 42 of the prism with the tilt plane. Therefore, two reflecting planes 42 and 46 are formed.

Figure 4B:
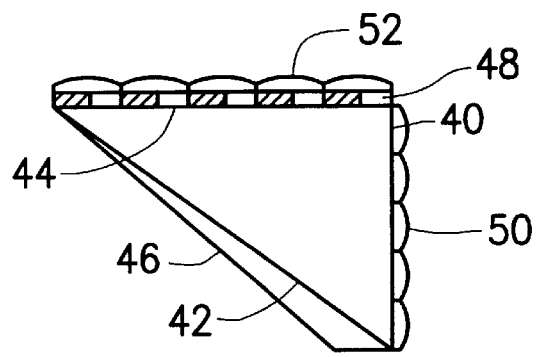
Figure 4C:
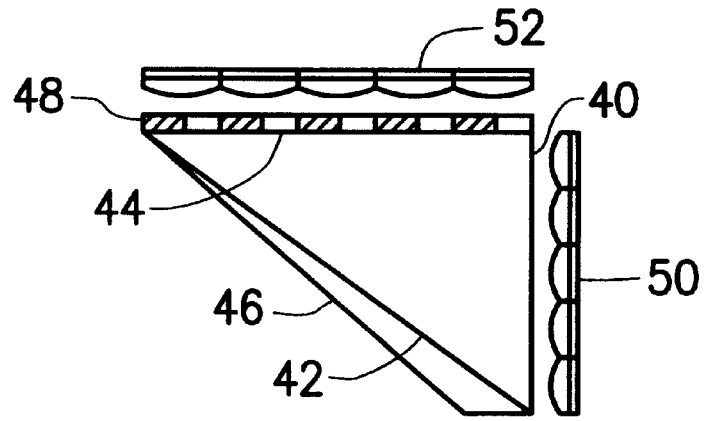

Referring to FIG. 4b and FIG. 4c, a light distributor lens array 50 is disposed in front of the incident plane 40, and a light integrator lens array 52 is disposed on the emerging plane 44. Between the light integrator lens array 52 and the emerging plane 44, a half-wave plate 48 is disposed to convert the polarized light into the other polarization. The light distributor lens array 50 and the light integrator lens array 52 can be arranged as shown in either FIG. 4b or FIG. 4c.

Figure 5:
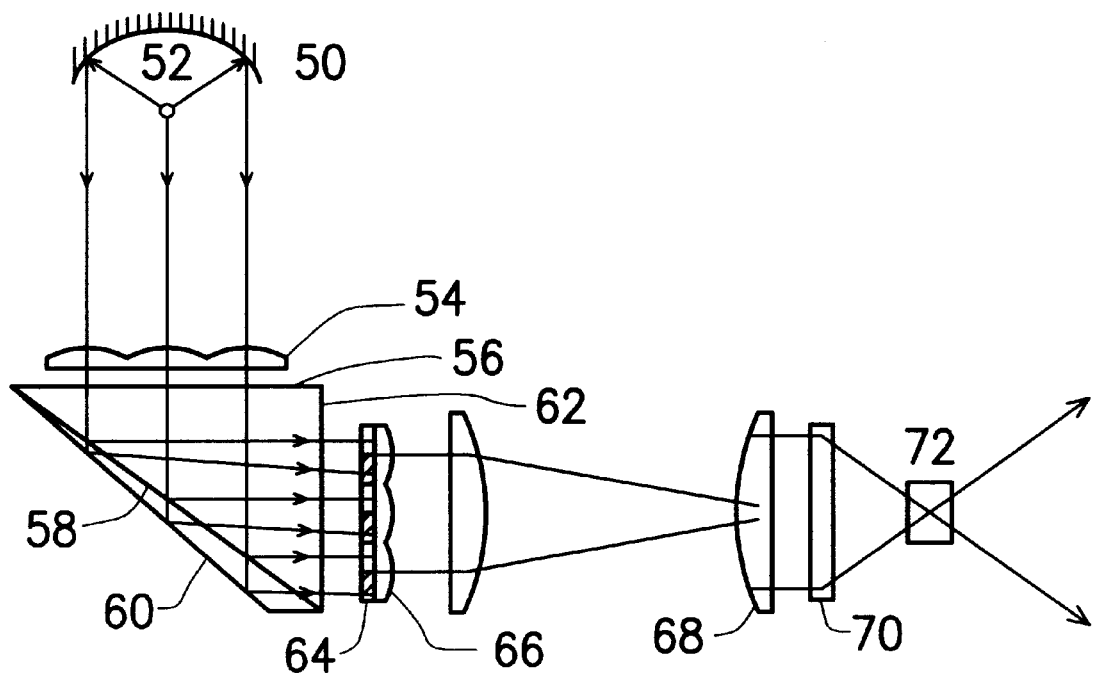
FIG. 5 shows the optical path of the polarization converter shown in FIG. 4a to FIG. 4c.

Referring to FIG. 5, a light source 52 is reflected and collimated by a reflecting plane 50. The collimated light beam is incident through the light distributor lens array 54 to achieve light distribution. The light beam enters the prism through the incident plane 56. The first reflected plane 58 splits and polarizes the light beam into two lights. One first type polarized light, for example, a P-polarized light, travels through the emerging plane with a right angle to the incident unpolarized light beam. The other light is a second type polarized light, for example, an S-polarized light. The second polarized light travels forward without changing direction until incident on the second reflecting plane 60. Through the second reflecting plane 60, more than 99% of the second type polarized light is reflected with a right angle and incident towards the emerging plane 62. Before emerging out of the prism, the second type polarized travels through a half wave plate 64 and is converted to another first type polarized light. Through the light integrator lens array 66, both first type polarized lights are collected and converged by a light convergent lens 68. The converged light is then projected on a screen via a liquid crystal display 70 and a projector 72.

In the invention, the superposition characteristic of a light propagating in a medium is applied. By calculating the tilt angle and the thickness of the wedge, the polarized light is projected in a same direction after polarization.

According to the optimized conditions of the design of NocNeille broad band polarizer, $$n_p \sin\Theta_p = \frac{n_L n_H}{\sqrt{n_L^2 + n_H^2}}$$

wherein, $n_p$ is the refractive index of the prism and the wedge, $\Theta_p$ is the incident angle of light from prism to the polarization dichronic thin film, and $n_L$ and $n_H$ are low refractive index and high refractive index of the multi-layer polarization dichronic thin film, respectively, since $n_p$, $\Theta_p$, $n_L$, and $n_H$ are known, the spectrum of the reflectivity $R_S$ and $R_P$ of the S- and P-polarized lights can be calculated. In addition, since $n_L$ and $n_H$ have no absorption, the transmittance of the P-polarized light, $T_P$, can be obtained by $1-R_P$. The polarization dichronic thin film coated between the prism and the wedge reflects 99% of the perpendicular first type polarized light, and transmits 99% of the parallel second type polarized light. Since the incident angle of 45° is larger than the critical angle between the wedge and air, about 100% of the second type polarized light is reflected by the tilt plane of the wedge. About 99% of the reflected second type polarized light then transmits through the polarization dichronic plane. The efficiency of usable light energy of the system is as high as about 95% or more Other embodiment of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A polarization converter for an unpolarized light, comprising:

a prism, comprising an incident plane, a first reflecting plane and an emerging plane;

a wedge, comprising a tilt plane coated with a polarization dichronic thin film and an uncoated reflecting plane;

a set of lens array, comprising a light distributor lens array and a light integrator lens array; and a half-wave plate;

wherein the tilt plane of the wedge is glued on the first reflecting plane, so that the uncoated reflecting plane of the wedge becomes a second reflecting plane;

the light distributor lens array is disposed in front of the incident plane;

the light integrator lens array is disposed on the emerging plane; and the half-wave plate is disposed between the emerging plane and the light integrator lens array.

2. The polarization converter according to claim 1, wherein a light incident through the first reflecting plane is split and polarized into a first type polarized light and a second type polarized light.

3. The polarization converter according to claim 2, wherein the first type polarized light includes a P-type polarized light, and the second type polarized light includes an S-type polarized light.

4. The polarization converter according to claim 2, wherein the first type polarized light includes an S-type polarized light, and the second type polarized light includes a P-type polarized light.

5. The polarization converter according to claim 2, wherein the half-wave plate converts the second type polarized light to another first type polarized light.

6. The polarization converter according to claim 1, wherein 99% of the first type polarized light is reflected by the first reflecting plane, and 99% of the second type polarized light transmits through the the first reflecting plane.

* * * * *